March 29, 1949.   S. J. JENKINS   2,465,455
POKE
Filed Feb. 3, 1948
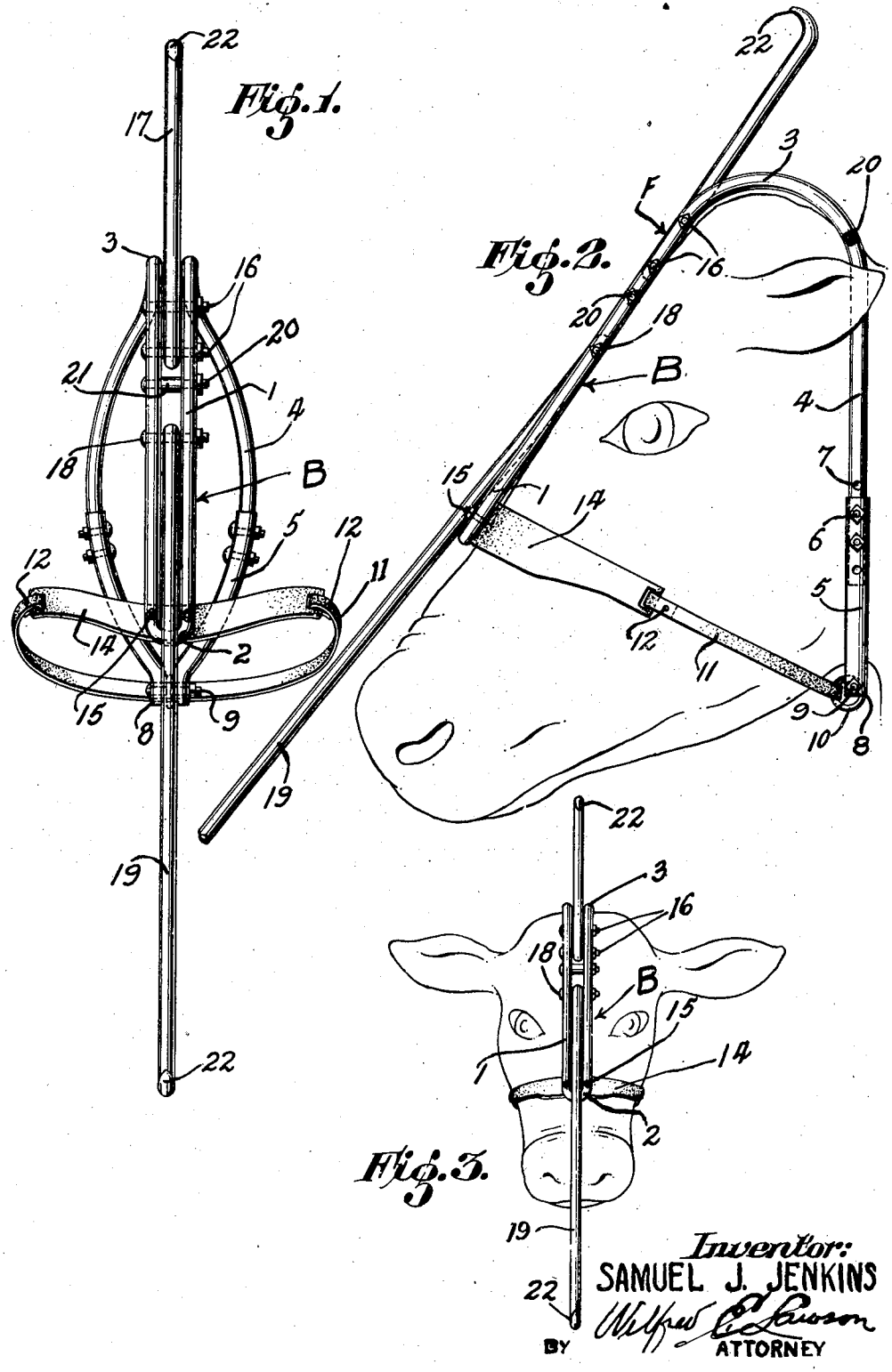
Inventor:
SAMUEL J. JENKINS
BY
ATTORNEY Patented Mar. 29, 1949

2,465,455

UNITED STATES PATENT OFFICE 2,465,455

POKE

Samuel J. Jenkins, Waxahachie, Tex.

Application February 3, 1948, Serial No. 5,950

7 Claims. (Cl. 119—142)

This invention relates to an animal poke and it is an object of the invention to provide a device of this kind having means whereby the same is effectually held in position upon the head of the animal.

It is also an object of the invention to provide a device of this kind including an upper guard and a lower guard and wherein the lower guard is mounted in a manner to offer no hindrance or obstruction to the animal when feeding.

The invention consists in the details of construction and in the combination and arrangement of the several parts of my improved poke whereby certain advantages are attained, as will be hereinafter more fully set forth.

In order that my invention may be better understood, I will now proceed to describe the same with reference to the accompanying drawings, wherein:

Figure 1 is a view in front elevation of a poke constructed in accordance with an embodiment of the invention unapplied;

Figure 2 is a view in side elevation showing the poke in applied position, the lower guard being in fragment; and Figure 3 is a view in front elevation on a reduced scale with the device applied as in Figure 2.

As disclosed in the accompanying drawings, the poke comprises a body member B formed from a single length material of requisite gauge and possessing required rigidity.

The body B is formed to provide two elongated parallel bars 1 in close relation which extend, when the poke is applied to the head of an animal, downwardly from above to a point materially below the eyes of the animal. The outer or lower extremities of the bars 1 are integrally connected by the intermediate member 2, while the opposite extremities of the bars are continued by the rearwardly directed arcuate extensions 3 on such radii to bridge the top of the head of the animal, as shown in Figure 2 of the drawings.

The extensions 3 are continued by the outwardly bowed bars 4 to straddle from above the neck of the animal. The extensions 3 possess sufficient inherent resiliency to permit desired placing of the body B upon the head of the animal within, of course, certain limitations.

Slidably engaged with the lower or free end portions of bars 4, are the tubular curved bars 5, held in selected adjustment on the bars 4 by the holding members 6 within the limitations afforded by the opening 7 through each of the bars 4.

The lower or outer ends of the bars 5 are continued by the outstanding lugs 8 disposed substantially in parallelism and through which is freely and removably inserted a holding member 9. It is therefore to be noted that the members 5, when unapplied, have free relative swinging movement or may be entirely separated as the requirements of practice may prefer and especially when applying or removing the bars 5, with respect to the bars 4.

Freely held by the member 9 between the lugs 8, is a ring 10 and freely threaded through the ring 10 is a strap 11 of a length to extend from below, a material distance across the sides of the face of the head of the animal. The extremities of the strap 11 are securely attached, as at 12, to the extremities of a broad nose strap 14 which extends across and contacts from above with the nose of the animal at the lower or connected extremities of the bars 1. The central portion of the nose strap 14 is securely fastened as at 15 to the bars 1.

It is believed obvious that with the bars 5 free of the bars 4, the body B may be readily and effectively applied to the head of the animal and can be removed with equal facility upon freeing the bars 5 from the bars 4.

Held by the bolts 16, or the like, between the upper portions of the bars 1, is the lower portion of the elongated upper guard 17, which may be called the stationary guard. Pivotally held, as at 18, between the bars 1 at a desired point inwardly of the guard 17, is the lower elongated guard 19 which overlies the intermediate portion 2 of the body B and extends a desired distance therebeyond. The mounting of the lower guard 19 permits the same to freely swing up when the animal to which the poke is applied is feeding.

The bars 1 between the guards 17 and 19 and the extensions 3 adjacent to the bars 4 have associated therewith spacing means, each of which as herein comprised includes a bolt 20 and an intermediate sleeve 21 surrounding such bolt 20.

The guards 17 and 19 are herein disclosed as substantially straight members, each of desired length and provided at its outer extremity with a conventional forwardly directed hook lug 22.

From the foregoing description it is thought to be obvious that a poke constructed in accordance with my invention is particularly well adapted for use by reason of the convenience and facility with which it may be assembled and operated.

I claim:

1. An animal poke comprising a body having a part to extend from above along the center of the face of an animal, rearward extensions carried by said part to extend over the head of the animal, bars continuing from the extensions to extend along opposite sides of the neck of the animal, additional bars detachably engaged with the free end portions of the first bars to extend below the neck of the animal, means for connecting the outer end portions of the second bars, a nose strap secured to the lower portion of the part of the body, and a flexible member secured to the extremities of the nose strap, the intermediate portion of the flexible member being slidably connected with the connected outer end portions of the second bars, and upper and lower guards carried by the part of the body extending along the head of the animal.

2. A poke as set forth in claim 1, wherein the part extending along the head of the animal embodies two substantially parallel members and wherein said members, the extensions and the first bars are provided from a single length of material.

3. A poke as set forth in claim 1, wherein the extensions are resilient.

4. A poke as set forth in claim 1, wherein the lower guard is mounted for free outward swinging movement.

5. A poke as set forth in claim 1, wherein the connection for the outer extremities of the second bars comprises a pivot member permitting the second bars to have independent movement when either one of said second bars is free.

6. A poke as set forth in claim 1, wherein a ring is carried by the connected outer extremities of the second bars and through which the flexible member freely passes.

7. A poke as set forth in claim 1, wherein the connection between the first bars and second bars is selectively adjustable along the first bars.

SAMUEL J. JENKINS.

REFERENCES CITED

The following references are of record in the file of this patent:

UNITED STATES PATENTS

| Number | Name | Date |
|---|---|---|
| 494,754 | Brown | Apr. 4, 1893 |
| 703,367 | Barnes | July 1, 1902 |
| 1,091,414 | Williams | Mar. 24, 1914 |
| 1,617,497 | Pendergraft | Feb. 15, 1927 |

FOREIGN PATENTS

| Number | Country | Date |
|---|---|---|
| 175,518 | Canada | Mar. 6, 1917 |